United States Patent [19]

Itoh et al.

[11] 4,139,519
[45] Feb. 13, 1979

[54] CURABLE COMPOSITIONS BASED ON SILICON-CONTAINING BUTADIENE POLYMERS

[75] Inventors: Kunio Itoh; Kiyoshi Imai; Masaki Tanaka; Kimitaka Kumagae, all of Annaka, Japan

[73] Assignee: Shin-Etsu Chemical Co., Ltd., Tokyo, Japan

[21] Appl. No.: 825,419

[22] Filed: Aug. 17, 1977

[30] Foreign Application Priority Data

Aug. 19, 1976 [JP] Japan ................................ 51-98892

[51] Int. Cl.$^2$ ..................... C08L 83/06; C08L 83/00; C08K 3/00
[52] U.S. Cl. ................................ 260/42.26; 260/827; 526/227; 526/232; 526/279; 528/24; 528/25; 528/26; 528/27; 260/879
[58] Field of Search ............ 260/827, 46.5 UA, 42.26; 528/24, 25, 26, 27

[56] References Cited

U.S. PATENT DOCUMENTS

| | | | |
|---|---|---|---|
| 2,952,576 | 9/1960 | Wheelock et al. | 260/827 |
| 3,471,440 | 10/1969 | Ashby | 260/827 |

*Primary Examiner*—Wilbert J. Briggs, Sr.
*Attorney, Agent, or Firm*—Toren, McGeady and Stanger

[57] ABSTRACT

The curable composition provided by the present invention comprises a butadiene polymer having organosilicon groups as the pendant groups, an ethylenically unsaturated polymerizable compound, an organic peroxide, and optionally a filler. The butadiene polymer being the base of this composition can readily be obtained by the platinum-catalyzed addition reaction between an organosilicon compound having a hydrogen atom directly bonded to the silicon atom in a molecule and the ethylenic unsaturation of a conventional butadiene polymer.

The compositions of the invention are remarkably superior in many respects to those composition based on ordinary butadiene polymers, and useful for applications in a wide variety including the production of electrically insulating materials and various kinds of industrial articles.

19 Claims, No Drawings

CURABLE COMPOSITIONS BASED ON SILICON-CONTAINING BUTADIENE POLYMERS

BACKGROUND OF THE INVENTION

The present invention relates to novel curable compositions based on silicon-containing butadiene polymers.

Ordinary polybutadienes or copolymers of butadiene as the main component which can be obtained by polymerization in bulk, solution, or in emulsion generally have ethylenically unsaturated linkages in their molecular structure and readily cure with heat through crosslink formation in the presence of an organic peroxide. The cured products has excellent electric and other physical properties, by virtue of which they enjoy a wide field of applications including molding and impregnation of electric parts and the like.

The above polybutadienes and copolymeric butadiene polymers, which usually are liquid at room temperature, have the following disadvantages.

(1) The viscosity of polymer tends to greatly increase, sometimes to a degree enough to form a nonflowing mass and lower workability, when a siliceous filler is added.

(2) The viscosities of polymers vary within a wide range depending on temperatures.

(3) The curing reaction of polymer is very exothermic, while volume shrinkage is large.

(4) The adhesive bond of polymer after cure to substrate is poor.

(5) The cured products obtained from the polymers have inferior heat stability and resistance to oxidation.

(6) The cured products with a higher content of 1,2-polybutadiene structure in the molecular structure are usually brittle and poorly flexible, and tend to crack, while those with a higher content of 1,4-polybutadiene structure in the molecular structure are less reactive and less curable.

SUMMARY OF THE INVENTION

Therefore, the present invention is proposed to provide novel curable compositions based on silicon-containing butadiene polymers which are free from the above described disadvantages encountered in the prior art compositions.

The composition of the invention comprises (a) 100 parts by weight of a silicon-containing butadiene polymer having at least one organosilicon group bonded through the carbon-to-silicon linkage to the main chain in a molecule of a polybutadiene or a copolymer mainly composed of butadiene, the organosilicon group being represented by the general formula $R_3Si-$ where R is a monovalent hydrocarbon group or an organosiloxy group, (b) from 1 to 200 parts by weight of an ethylenically unsaturated polymerizable monomer compound, (c) from 0 to 900 parts by weight of a filler, and (d) from 0.03 to 30 parts by weight of an organic peroxide.

The composition of the invention using component (a) which is liquid at room temperature does not remarkably increase its viscosity by adding a filler component, and can have fluidity suitable for casting or potting purposes. The viscosities of the compositions have a relatively small temperature dependency, and yet the compositions can be readily cured by cross-linking when heated in the presence of an organic peroxide in a short time and with little heat evolution, to produce cured products having excellent heat stability, electric properties, mechanical strengths and the like. Further, the composition of the present invention when cured can have a strong adhesive bond to substrate, such as thermoplastic or thermosetting resins, glass, ceramics, and metals. Furthermore, the composition is advantaged by its small volume shrinkage when cured.

DETAILED DESCRIPTION OF THE PREFERRED EMBODIMENTS

Component (a) useful in the composition of the present invention is a silicon-containing butadiene polymer having at least one organosilicon group bonded through the carbon-to-silicon linkage to the main chain in a molecule of a polybutadiene or a copolymer mainly composed of butadiene, the organosilicon group being represented by the general formula $R_3Si-$ where R is a monovalent hydrocarbon group or an organosiloxy group. A typical example of the monovalent hydrocarbon groups of symbol R is a methyl group, while those of the organosiloxy groups are a trimethylsiloxy group $(CH_3)_3SiO-$ and (trimethylsiloxy)dimethylsiloxy group $(CH_3)_3Si-O-(CH_3)_2Si-O-$. Three of the R groups in the $R_3Si-$ group may be the same or different from each other.

Such silicon-containing butadiene polymer may be obtained by an addition reaction, in the presence of a platinum catalyst such as platinum black, chloroplatinic acid and an olefin complex of chloroplatinic acid, between an organosilicon compound with a hydrogen atom bonded directly to the silicon atom and a polybutadiene or a copolymer mainly composed of butadiene produced by a conventional polymerization method (see copending U.S. patent application Ser. No. 752,173).

The above addition reaction is a reaction taking place between the silicon-bonded hydrogen atoms in the organosilicon compound and the ethylenic unsaturation in the 1,2-polybutadiene or 1,4-polybutadiene. The reaction can proceed rapidly at an elevated temperature up to 120° C. by use of the above-mentioned platinum catalyst.

The polybutadiene used for the preparation of the silicon-containing butadiene polymer may be 1,2-polybutadiene, 1,4-polybutadiene or mixtures thereof. The copolymer of butadiene may be any one that has the ethylenic unsaturation of a 1,2-polybutadiene or 1,4-polybutadiene structure in its molecular structure. The comonomers to be copolymerized with butadiene are exemplified by styrene, acrylonitrile, methacrylonitrile, acrylic acid, methacrylic acid, ethyl acrylate, butyl acrylate, 2-ethylhexyl acrylate, methyl methacrylate, ethyl methacrylate, n-butyl methacrylate, glycidyl methacrylate, α-chloroacrylonitrile, acrylamide, vinyl isobutyl ether, vinyl acetate, vinyl chloride, vinylidene chloride, methyl vinyl ketone, 2-vinylpyridine, 9-vinylcarbazol, α-methylstyrene, ethylene, and propylene. They can be used either singly or in combination of two or more.

It is optional that the polybutadiene or the butadiene copolymers may be modified by partial hydrogenation, epoxidation, enic addition, halogenation and other modification reactions of the ethylenic unsaturation in the molecules to an extent such that the advantages of the present invention will not be removed or reduced. The terminal groups or atoms at the chain ends of the molecules of those butadiene polymers or copolymers are not limitative, but may be any of hydroxy, vinyl, allyl, methacryl, carboxyl, amino, mercapto, and isocyanate groups, halogen atoms, and the like. Preferably, the terminal groups are allyl or methacryl groups, or the chain ends are blocked with half esters of maleic acid.

The polybutadiene or the butadiene copolymer is desirably liquid at room temperature so that the intended curable compositions have a good fluidity suitable for use in casting or like applications.

The organosilicon compounds to be brought into the addition reaction with the polybutadiene or the butadiene copolymer include organosilanes and organopolysiloxanes having a silicon-bonded hydrogen atom in a molecule. It is recommended that the organosilicon compound has one and only one silicon-bonded hydrogen atom in a molecule in order to give a good flowing property to the resultant compositions. This is because that the organosilicon compounds having two or more silicon-bonded hydrogen atoms in a molecule may lead to undesirable viscosity increases, and finally to gelation, during storage.

Such organosilicon compounds that satisfy the above requirements are, as the organosilanes, organosilanes expressed by the general formula $HSiR^1R^2R^3$ where $R^1$, $R^2$ and $R^3$ are each the same or different substituted or unsubstituted monovalent hydrocarbon groups. Illustrative of groups $R^1$, $R^2$ and $R^3$ are alkyl groups, such as methyl, ethyl, propyl, butyl and octyl groups; aryl groups, such as phenyl and tolyl groups; cycloalkyl groups, such as cyclopentyl and cyclohexyl groups; and those groups having halogen atoms or cyano groups and the like as the substituents in place of part or all of the hydrogen atoms in the above-mentioned hydrocarbon groups.

The organosilicon compounds as the organopolysiloxanes include organohydrogenpolysiloxanes having various molecular structures and polymerization degrees, and a silicon-bonded hydrogen atom in a molecule. The polymerization degree of the organohydrogenpolysiloxane is preferred to be relatively low in order that its addition reaction with the polybutadiene or the butadiene copolymer can proceed smoothly. Examples of such organohydrogenpolysiloxanes are those expressed by the following formulas. In the formulas, Me and Ph denote a methyl group and a phenyl group, respectively.

(H)(Me)₂SiOSi(Me)₃

(H)(Me)₂SiOSi(Ph)₂(Me)

(H)(Me)₂SiOSi(Me)₂OSi(Me)₃

(Me)₃SiOSi(H)(Me)OSi(Me)₃

(H)(Me)Si[OSi(Me)₂(Ph)]₂

(H)(Me)Si[OSi(Me)₂OSi(Me)₃]₂

(H)(Me)Si[OSi(Ph)₂(Me)]₂

HSi[OSi(Me)₃]₃

HSi[OSi(Ph)₂(Me)]₃

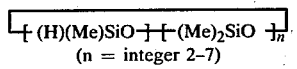
(n = integer 2–7)

-continued

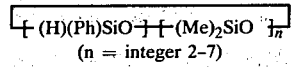
(n = integer 2–7)

It is optional of course that an organohydrogenpolysiloxane having two or more silicon-bonded hydrogen atoms in a molecule may be employed in combination with the organohydrogenpolysiloxane having only one silicon-bonded hydrogen atom in a molecule. In this case, however, it must be noted that the amount of the former in proportion to the latter is limitedly low, since an increased proportion tends to increase the viscosity of a product obtained by reaction with the polybutadiene or butadiene copolymer, possibly to the extent of causing gelation.

It is also optional that two or more of the above-described organosilicon compounds are employed simultaneously in combination in their addition reaction with the butadiene polymers.

In the addition reaction between the polybutadiene or butadiene copolymer and the organosilicon compound having a silicon-bonded hydrogen atom in a molecule, the molar ratio of the reactants is preferably determined such that the mole ratio of the silicon-bonded hydrogen atoms in the latter compound to the ethylenically unsaturated linkages in the former compound is within the range from 0.15 to 0.90 or, preferably, from 0.25 to 0.80, corresponding to the molar ratio of the unreacted ethylenically unsaturated linkages to the organosilicon groups in the range from 0.85:0.15 to 0.10:0.90 or, preferably, from 0.75:0.25 to 0.20:0.80, with assumed 100% reaction efficiency. With a larger amount of the butadiene polymers, the desired properties of the composition of the invention cannot be fully exhibited, while a too small amount of it leads to the consumption of all or almost all of the ethylenically unsaturated linkages in the butadiene polymer during the addition reaction and the curing property of the resultant composition become unsatisfactory.

Next, component (b) useful in the compositions of the present invention is a component required for obtaining compositions with an excellent fluidity as well as curing property. It serves also to adjust flexibility and improve mechanical properties to be afforded to articles produced from the composition of the present invention.

The ethylenically unsaturated monomers suitable for use as component (b) in the present invention are exemplified by ethylenically unsaturated aromatic compounds, such as styrene, α-methylstyrene and chlorostyrene; acrylic acid, methacrylic acid and esters thereof, such as ethyl acrylate, butyl acrylate, 2-ethylhexyl acrylate, methyl methacrylate, ethyl methacrylate, n-butyl methacrylate, higher alkyl methacrylates (e.g. lauryl methacrylate), glycidyl methacrylate, mono- and dimethacrylic esters of ethyleneglycol, glycidyl methacrylate, phenoxyethyl methacrylate, polyoxyethyleneglycol dimethacrylate; methacrylic esters of trimethylolpropane; allyl compounds, such as triallyl cyanurate and diallyl phthalate; diesters of maleic acid, such as diethyl maleate; and diesters of fumaric acid, such as dimethyl fumarate. Among these compounds preferred are styrene, chlorostyrene, glycidyl methacrylate, butyl methacrylate, lauryl methacrylate and phenoxyethyl methacrylate. The higher alkyl methacrylates are advantaged by its low volatility and less offensive odors, safe from environmental pollution.

The above-mentioned compounds can be used singly or in combination of two or more to form component (b) in the composition of the invention. The amount of component (b) in the composition is in the range from 1 to 200 parts by weight or, preferably, from 5 to 150 parts by weight per 100 parts by weight of component (a).

Component (c) useful in the composition of the invention is a filler, and may not be added when it is intended to obtain a cured product which is transparent. However, it is recommended to use this component for purposes of improvement in mechanical strengths and low shrinkage and smaller heat evolution in curing as well as in resistance to cracking and electric properties to be imparted to the resultant cured products. The filler may be added as a sort of extender for the purpose of lowering production cost.

Component (c) may be organic or inorganic. The organic fillers are exemplified by polyethylene, polyvinyl chloride, fluorinated polymer resins, wood flour, cellulosic materials, carbonaceous materials, and the like, while the inorganic ones are exemplified by siliceous materials, such as quartz flour, fumed silica, precipitated silica and diatomaceous earth; talc, clay, alumina, calcium carbonate, zinc oxide, magnesium oxide, glass fibers, glass beads, glass microballoons, and the like. As another sort of the fillers, coloring agents may be used to color the compositions of the present invention. Their examples are metal oxides, such as titanium dioxide, iron oxide, cobalt oxide and chromium oxide, and other organic and inorganic pigments and dyes.

The amount of component (c) used is 900 parts by weight or less based on 100 parts by weight of component (a). It should be from 20 to 600 parts by weight on the same base particularly when one intends to form a composition having still a better fluidity and yet capable of producing a cured product with improved mechanical strengths and such other properties as described hereinbefore.

The incorporation of a substantial amount of the filler into the composition of the present invention naturally results in a remarkable increase in the consistensy of the composition. When the silicon-containing butadiene polymer as component (a) is admixed with a filler and component (b) is omitted, increases in the consistency are so large that the workability of the resultant composition is badly reduced. Comparative to this, the composition of the present invention comprising these components (a), (b) and (c) still retains a sufficient fluidity, and hence workability for processing into various cured products.

The organic peroxide as component (d) useful in the composition of this invention is a crosslinking agent for components (a) and (b). The organic peroxide is desirably free from the phenomenon of foaming during curing reaction. This is because that the foaming phenomenon takes place within the composition due to decomposition of the organic perioxide during curing and results in bringing about inferior properties to the cured products. Suitable organic peroxides are exemplified by alkylhydroperoxides, such as cumene hydroperoxide; dialkyl peroxides, such as di-tert-butyl peroxide, 1,1-bis-tert-butyl-peroxy3,3,5-trimethylcyclohexane and dicumyl peroxide; diacyl peroxides, such as benzoyl peroxide and 2,4-dichlorobenzoyl peroxide; peroxyesters; such as 2,5-dimethyl-2,5-di(benzoylperoxy)hexane and tert-butyl perbenzoate; and ketone peroxides, such as methylethylketone peroxide. They can be used either singly or in combination of two or more. The amount of the organic peroxide as component (d) in the composition is in the range from 0.03 to 30 parts by weight or, preferably, from 0.1 to 5.0 parts by weight per 100 parts by weight of component (a).

In order to carry out the curing reaction in a more rapid manner even at lower temperatures, it is recommended to use, in combination with the above mentioned organic peroxides, a curing accelerator, such as a metal salt of an organic acid (e.g. cobalt naphthenate and manganese naphthenate) or an amine compound (e.g. N,N-dimethylaniline and N,N-dimethyl-p-toluidine).

It is also an acceptable practice that various kinds of additives conventionally employed in the silicone rubbers are incorporated into the composition of the present invention. Their examples are antioxidants, such as alkylphenols and esters of higher alcohols; ester silanes generally known as silane coupling agents, having functional groups, such as vinyl, methacryl, glycidyl, amino and mercapto groups; plasticizers; unsaturated polyester resins; flame retardants, such as metal hydroxides, (e.g. aluminum hydroxide), halogen-containing organic compounds, and organic phosphorus compounds.

Among these additives, the silane coupling agents are especially recommendable in order to afford cured products with further improved mechanical strengths and water- or moisture-proofness. The silane coupling agents work to strengthen bonding force between the filler and the organopolysiloxane and enhance adhesive bonding strength to substrate surfaces.

The compositions of the present invention are prepared by uniformly mixing and kneading the individual components described hereinabove.

Owing to their outstandingly unique properties, the compositions are useful not only as an electrically insulating material but also as a material for general industrial uses. For use as the electrically insulating material, the compositions are subjected to casting, laminating, pressure molding, coating, dipping and other means, and directed to applications in the fields, for example, of condensers, high voltage transformers in television sets, resistors, electric motors, transistors, diodes, cable joints, and various shaped articles like sockets, plug receptacles, bushings, connectors and switches, as well as to applications for printed circuit boards and various coils. Further, for use as the general industrial material, the compositions are directed to applications in the fields of vehicles, e.g. automobiles, sea vessels, medical wares and food processing or cookery utensils as shaped articles, as well as to the manufacture of scientific specimens, botanical or zoological, as a transparent sealing material, various replica articles, various jigs and other tools.

The following examples will further illustrate the present invention. In the examples, parts are all parts by weight.

EXAMPLE 1.

A mixture of 100 parts of a 1,4-polybutadienestyrene copolymer (Poly bd CS-15, product of Idemitsu Petrochemical Co., Japan), 25 parts of pentamethyldisiloxane and 0.01 part of a solution of chloroplatinic acid in 2-ethylhexyl alcohol in a concentration of 2% by weight as platinum was charged into an autoclave and heated with agitation at 120° C. for 6 hours during which the pressure inside the autoclave reached 3 kg/cm$^2$G at the highest.

Thereupon, the mixture was taken out of the autoclave and stripped of any unreacted pentamethyldisiloxane at 100° C. under reduced pressure at 5 mmHg, to obtain a less volatile reaction product. This reaction product was determined for increase in weight and residual ethylenic unsaturation, to confirm that the reaction product was a silicone modified polybutadienestyrene copolymer in which about 50 mole % of the ethylenic unsaturation in the main chain of the starting polybutadiene-styrene copolymer was saturated by the addition of the pentamethyldisiloxane. This product is hereinafter referred to as silicon-containing butadiene polymer A.

Using 80 parts of silicon-containing butadiene polymer A, a composition was prepared by mixing same with 20 parts of styrene, 0.2 part of a solution of cobalt naphthenate in a concentration of 8% as cobalt, and 2 parts of 1,1-bis-tert-butylperoxy-3,3,5-trimethylcyclohexane. The composition thus prepared had a viscosity of 50 centipoise at 25° C.

The composition was cured by heating at 120° C. for 2 hours. The resulting cured product was transparent, flexible, and elastic with a Shore A hardness of 60 and a tensile strength of 10 kg/cm$^2$.

For comparison, a similar composition was prepared with the same formulation as above excepting that 80 parts of Poly bd CS-15 as such was used instead of 80 parts of silicon-containing butadiene polymer A. This comparative composition was heated at 120° C. for 2 hours, but failed to give a cured product.

For a further comparison, a similar composition was prepared with the same formulation as above excepting that the amount of silicon-containing butadiene polymer A used was 100 parts instead of 80 parts and 20 parts of styrene was omitted. The composition had a viscosity of 11,000 centipoise at 25° C. and could be cured by heating at 120° C. for 2 hours. The resulting cured product has a shore A hardness of 20 and a tensile strength of only 2 kg/cm$^2$.

On the other hand, 100 parts each of the above-prepared compositions was admixed with 20 parts of a fumed silica filler (Silanox 101, product of Cabot Corp.). The resulting silica-filled compositions were compared to each other with respect to fluidity and transparency, to obtain the results that the compositions including silicon-containing butadiene polymer A were superior to that excluding silicon-containing butadiene polymer A and including Poly bd CS-15 instead in both respects. Example 2.

An addition product, hereinafter referred to as silicon-containing butadiene polymer B, was prepared by reacting a 1,4-polybutadiene (Polyoil 110, product of Japan Geon Co., Japan) with pentamethyldisiloxane in the same manner as in Example 1 to a degree of addition such that about 50 mole % of the ethylenic unsaturation in the starting polybutadiene was saturated by the addition reaction. Using the thus prepared silicon-containing butadiene polymer B, a composition was formed with the same formulation as in Example 1 (omitting silicon-containing butadiene polymer A). The composition was heated at 120° C. for 2 hours, to produce a transparent and flexible cured elastomer.

On the other hand, a similar composition was prepared with the same formulation as above using Polyoil 110 as such instead of silicon-containing butadiene polymer B. The composition was subjected to heating at 120° C. for 2 hours, but failed to cure.

EXAMPLE 3

Five addition products, hereinafter referred to as silicon-containing butadiene polymers C, D, E, F and G, respectively, were prepared by the reaction of Poly bd CS-15 and pentamethyldisiloxane, in which about 15, 30, 50, 70 and 85 mole %, respectively, of the ethylenic unsaturation in the starting butadiene copolymer was saturated by the addition reaction.

To 70 parts of Poly bd CS-15 and each of silicon-containing butadiene polymers C to G were added and mixed 25 parts of styrene, 5 parts of trimethylolpropane methacrylate, 100 parts of quartz flour, 0.3 part of the same solution of cobalt naphthenate as used in Example 1, and 2.0 parts of cumene hydroperoxide, to form curable compositions. The composition with Poly bd CS-15 was outside the present invention and for comparative purposes. Each composition thus prepared was placed in an aluminum dish and heated at 120° C. for 2 hours to become cured.

The compositions were tested for fluidity before curing, curability, hardness of cured product by Shore A, and adhesive bonding strength to the aluminum dish surfaces after cure. The results are set out in Table I.

Table I

| Butadiene polymer used | Fluidity | Curability | Hardness | Adhesive bonding |
|---|---|---|---|---|
| Poly bd CS-15 | Thixotropic | Uncured | — | Unbonded |
| C | Slightly thixotropic | Cured, with tacky surface | 82 | Bonded, with partly cleavages |
| D | Self-flowing | Completely cured | 74 | Firmly bonded |
| E | Self-flowing | Completely cured | 68 | Firmly bonded |
| F | Self-flowing | Completely cured | 65 | Firmly bonded |
| G | Self-flowing | Gelation only | — | — |

EXAMPLE 4

An addition product, hereinafter referred to as silicon-containing butadiene polymer H, was prepared by the addition reaction between a 1,2-polybutadiene acrylic-modified at the chain terminals (NISSO PB TE2000, product of Nippon Soda Co., Japan) and penta-methyldisiloxane to a degree of addition such that about 50 mole % of the ethylenic unsaturation in the starting polybutadiene was saturated by the addition reaction. To 65 parts of this butadiene polymer H were added and mixed 35 parts of styrene and 100 parts of quartz flour, to form a composition which, having a viscosity of 28 poise at 25° C., was curable and suitable for casting. The composition is hereinafter referred to as composition I.

Separately, a similar composition was prepared in the same manner except 65 parts of silicon-containing butadiene polymer H was replaced by 65 parts of NISSO PB TE2000 as such. The composition, having a viscosity of 47 poise at 25° C., exhibited thixotropy to some extent. This composition was directed to comparative purposes, and is hereinafter referred to as composition II.

To 100 parts each of the above Compositions I and II were added 0.2 part of the same solution of cobalt naphthenate as used in Example 1 and 1.5 parts of cumene hydroperoxide, and the mixtures were heated at 100° C. for 4 hours to form cured products. The cured product obtained with composition I had a Shore D hardness of 65 and exhibited flexibility, while that obtained with composition II had a Shore D hardness of 80 and exhibited no flexibility.

Further, each of compositions I and II was poured in an aluminum dish with a hexagonal iron nut placed at its center, followed by heating to form a composite of the cured composition and the nut embedded inside. The composites were tested for resistance to heat shock by repeating cooling-heating cycles, one cycle consisting of a cooling stage at −30° C. for 1 hour and a subsequent heating stage at 120° C. for 1 hour. As a result, the composite prepared with composition I remained unchanged during the repetition of 5 cycles, while that prepared with composition II became to produce hair cracks especially around the nut at the end of the third cycle. Further it was observed that the former composite exhibited a very firm bond to the aluminum surface in complete contact without cleavage at the end of the 5-cycle treatment, while the latter composite showed a clear cleavage between the aluminum surface and the cured surface only after a single cycle.

Besides the above heat shock test, changes in hardness and in weight were determined by heating the same cured composites at 200° C. for 200 hours. The results are set out in Table II, which evidently demonstrate the excellent heat stability and resistance to oxidation of the cured product prepared with the composition of the present invention.

Table II

|  | Increase in hardness | Loss in weight |
|---|---|---|
| Cured product with composition I | 11% | 2.4% |
| Cured product with composition II | 26% | 4.9% |

EXAMPLE 5

The silicon-containing butadiene polymer A prepared in Example 1 was reacted with maleic anhydride, to prepare a modified butadiene polymer in which the terminal hydroxy groups were blocked with half ester groups of maleic acid. Separately, Poly bd CS-15 as such was reacted with maleic anhydride to prepare a butadiene polymer end-blocked with half ester groups of maleic acid.

To 70 parts each of the above prepared two maleic-modified polymers were added 30 parts of styrene, 70 parts of quartz flour and 30 parts of alumina powder, to form curable compositions suitable for casting. Both compositions thus formed had the same viscosity of about 38 poise at 25° C.

Each of these compositions was mixed with 0.1 part of the same solution of cobalt naphthenate as used in Example 1 and 1.5 parts of cumene hydroperoxide per 100 parts of composition, and the mixtures were heated stepwise, first at 80° C. for 2 hours, then at 100° C. for 2 hours and finally at 120° C. for 1 hour, to produce cured products. One of the products, i.e., the silicon-containing product in accordance with the present invention was found to have a Shore A hardness of 65, while the other product which had no organosilicon groups had a Shore A hardness of 90, both products exhibiting rubber-like elasticity.

Further, it was observed that when the above curing was carried out in an aluminum or glass dish, a very firm, cleavage-free adhesive bond to the dish surface was obtained by the silicon-containing product in accordance with the invention even after a 5-cycle heat shock test, each cycle consisting of 1-hour cooling at −30° C. and subsequent 1-hour heating at 100° C., while no adhesive bond was obtained between the organosilicon groups-free cured product and the dish surface.

EXAMPLE 6

Cured products were prepared in the same manner as in Example 5 except only that the compositions excluded 30 parts of styrene and, instead, included each of the ethylenically unsaturated compounds as indicated in Table III. The cured products were tested for Shore A hardness with the results as shown in the same table. The adhesive bond of the cured products to the aluminum or glass dish surface was found complete and very firm.

Table III

| Ethylenically unsaturated compound | Shore A hardness |
|---|---|
| Chlorostyrene (30 parts) | 68 |
| Mixture of styrene (5 parts) and 3-Methacryloxypropyl-trimethoxysilane (5 parts) | 70 |
| Glycidyl methacrylate (30 parts) | 80 |
| Ethyleneglycol dimethacrylate (30 parts) | 85 |
| Butyl methacrylate (30 parts) | 65 |
| Lauryl methacrylate (30 parts) | 40 |

EXAMPLE 7

Using NISSO PB TE2000 as the starting butadiene polymer and one of the organosilicon compounds having a silicon-bonded hydrogen atom in a molecule as indicated in Table IV, four silicon-containing butadiene polymers were prepared by addition reaction in which the degree of addition was such that about 30 mole % each of the ethylenic unsaturation in the starting butadiene polymer was saturated. The polymers are hereinafter referred to as silicon-containing butadiene polymers I, J, K and L, respectively.

To 65 parts each of the above silicon-containing butadiene polymers I to L were added 25 parts of styrene, 5 parts of glycidyl methacrylate, 30 parts of alumina powder and 70 parts of quartz flour, to prepare compositions having an excellent fluidity.

Each composition was further admixed with 0.2 part of the same solution of cobalt naphthenate as used in Example 1 and 1.0 part of 1,1-bis-tert-butylperoxy-3,3,5-trimethylcyclohexane, and the resulting mixtures were heated at 100° C. for 2 hours, to form cured products having an excellent flexibility, as well as the Shore D hardness as indicated in Table IV. The adhesive bond of all the cured products to the aluminum dish surface was very firm. Further, the same 5-cycle heat shock test as in Example 5 was undertaken, producing no cleavage.

Table IV

| Butadiene polymer produced | Organosilicon compound, used | Shore D hardness |
|---|---|---|
| I | HSi(Me)$_3$ | 70 |
| J | (H)(Me)$_2$SiOSi(Me)$_2$OSi(Me)$_3$ | 62 |
| K | (Me)$_3$SiOSi(H)(Me)OSi(Me)$_3$ | 58 |
| L | HSi[OSi(Me)$_3$]$_3$ | 55 |

EXAMPLE 8

Another new butadiene polymer, hereinafter referred to as silicon-containing butadiene polymer M, was prepared by an addition reaction between a hydroxy-terminated 1,2-polybutadiene (NISSO PB G1000, product of Nippon Soda Co., Japan) and pentamethyldisiloxane in a degree of addition such that about 50 mole % of the ethylenic unsaturation in the starting polybutadiene was saturated, followed by a modification reaction with maleic anhydride to have the terminal hydroxy groups blocked with half ester groups of maleic acid.

Using the above silicon-containing butadiene polymer M, the previously prepared butadiene polymers A and H, NISSO PB TE2000 as the base materials together with various additives, 6 compositions (Nos. 1-6) were prepared as set out in Table V, in which the amount of each ingredient was given in parts. Each composition was observed and tested for the various properties, with the results as given in the same table.

In testing the compositions, curing was carried out by stepwise heating beginning at 80° C. for 2 hours, then at 100° C. for 2 hours, and finally at 120° C. for 1 hour. The heat shock test was carried out in the same manner with five repeated cycles as in Example 4.

at 100° C. for 2 hours and then at 120° C. for 2 hours to cure the composition. The adhesive strength of the thus bonded plates were examined to give the results as set out in Table VI, according to which breaking occurred not at the adhesion interface but within the bodies of the cured compositions in all cases except otherwise indicated.

Table VI

| Material of plate | Adhesive strength, kg/cm$^2$ |
|---|---|
| Aluminum | 158 |
| Soft steel | 132 |
| Copper | 119 |
| Stainless steel | 125 |
| Epoxy resin laminate | 172 |
| Bakelite resin | 120* |
| Noryl resin | 140 |
| Polycarbonate resin | 112 |

*Breaking occurred in the plates themselves.

Table V

| Composition No. | | 1 | 2 | 3 | 4 | 5 | 6 |
|---|---|---|---|---|---|---|---|
| Silicon- | A | 10 | 10 | 10 | 10 | 10 | — |
| containing | M | 30 | 25 | 20 | 20 | 15 | — |
| butadiene | H | 30 | 25 | 40 | 40 | 25 | — |
| polymer | | | | | | | |
| NISSO PB TE2000 | | — | — | — | — | — | 70 |
| Styrene | | 30 | 35 | 25 | 30 | — | 30 |
| Lauryl methacrylate | | — | — | — | — | 35 | — |
| Glycidyl methacrylate | | — | 5 | 5 | — | 15 | — |
| Quartz flour | | 100 | 30 | 100 | 150 | 150 | 50 |
| Alumina powder | | — | 70 | — | — | — | 50 |
| Co naphthenate solution | | 0.2 | 0.2 | 0.2 | 0.2 | 0.2 | 0.2 |
| Cumene hydroperoxide | | 2.0 | 2.0 | 2.0 | 2.0 | 2.0 | 2.0 |
| Viscosity of composition, poise at 25° C | | 44 | 31 | 55 | 210 | 25 | 90 |
| Maximum temperature *in curing, ° C | | 110 | 118 | 115 | 108 | — | 128 |
| Shore D hardness | | 70 | 78 | 75 | 82 | 65 | 90 |
| Flexural strength, kg/cm$^2$ | | ** | ** | 2.3 | 3.2 | ** | 3.5 |
| Adhesive strength against Noryl resin ***, kg/cm$^2$ | | 87 | 105 | 112 | 128 | 90 | 20 |
| Heat shock resistance | | Good | Good | Good | Good | Good | A few cracks |
| Shrinkage in curing, % | | 1.31 | 1.20 | 1.42 | 0.90 | 1.45 | 2.21 |

Notes to Table V:
*The highest temperature as heat evolution by curing recorded by a thermometer inserted in the center of a 200-g mass of the composition in a 200-ml glass beaker placed in an air oven at 80° C.
**Not broken, even with large flexural deformation.
***Product of General Electric Co.

EXAMPLE 9.

A non-flowing composition suitable for use as an adhesive or sealing material was prepared by blending 20 parts of silicon-containing butadiene polymer A, 70 parts of silicon-containing butadiene polymer H, 5 parts of ethyleneglycol dimethacrylate, 5 parts of 3-methacryloxypropyl trimethoxysilane, 30 parts of a fumed silica (Aerosil R 972, product of DEGUSSA), 100 parts of a fine calcium carbonate, 70 parts of quartz flour, 0.2 part of the same solution of cobalt naphthenate as in Example 1, 1.0 part of cumene hydroperoxide and 1.0 part of 1,1-bis-tert-butylperoxy-3,3,5-trimethylcyclohexane.

The composition was sandwitched by paired plates made of varied materials so as to adhesively bond to the plate surfaces, followed by stepwise heating beginning

EXAMPLE 10

Using the same silicon-containing butadiene polymers as used in Example 8 and various additives, five compositions (Nos. 7-11) were prepared as set out in Table VII, in which the amount of each ingredient was given in parts. These compositions were intended to have flame proofness and to be useful for casting to make electric insulating articles.

The thus prepared compositions and the products obtained by stepwise heat-curing, beginning at 80° C. for 2 hours, then at 100° C. for 2 hours, and finally at 120° C. for 1 hour were tested for the various properties with the details and results as set out in the same table.

In the following Table VII, the asterisked Anflam 3PB-R, Bromlite BR-55 and Dechlorane Plus are trademarks of Nippon Oils and Fats Co., Japan, Hitachi Chemical Co., Japan, and Fooker Chemical Corporation, U.S.A., respectively.

Table VII

| Composition No. | | 7 | 8 | 9 | 10 | 11 |
|---|---|---|---|---|---|---|
| Silicon- | A | 10 | 10 | 10 | 10 | 20 |
| containing | M | 20 | 30 | 30 | 20 | — |
| butadiene polymer | H | 40 | 30 | 30 | 40 | 50 |
| Ethyleneglycol dimethacrylate | | — | — | 5 | 5 | 10 |
| Chlorostyrene | | 50 | 50 | 30 | 55 | 50 |
| Quartz flour | | 120 | 100 | 60 | 150 | 150 |
| Alumina powder | | — | — | — | 20 | 20 |
| Iron oxide powder | | 5 | — | 5 | — | 5 |
| Anflam 3PB-R* | | — | 5 | 10 | — | — |
| Bromlite BR-55* | | — | 15 | — | 20 | 15 |
| Dechlorane Plus* | | 40 | 15 | 30 | 20 | 25 |
| Antimony oxide | | 15 | 15 | 15 | 10 | 15 |
| Co naphthenate solution | | 0.2 | 0.2 | 0.2 | 0.2 | 0.2 |
| Cumene hydroperoxide | | 1.5 | 1.0 | 1.5 | 1.5 | 1.5 |
| Viscosity of composition, poise at 25° C | | 25 | 21 | 55 | 30 | 34 |
| Shore D hardness | | 68 | 61 | 54 | 70 | 64 |
| Adhesive strength, kg/cm² | Polycarbonate resin | 100 | 80 | 65 | 115 | 90 |
| | Noryl resin | 115 | 95 | 80 | 130 | 90 |
| Flame retardancy, UL 94 | | Class V-0 | Class V-0 | Class V-0 | Class V-0 | Class V-0 |
| Dielectric constant at 1 MHz | As cured | 3.44 | 3.49 | 3.40 | 3.51 | 3.55 |
| | After immersion in water | 3.58 | 3.71 | 3.69 | 3.62 | 3.68 |
| Volume resistivity, ohm-cm | As cured | $1.2 \times 10^{16}$ | $8.6 \times 10^{15}$ | $4.8 \times 10^{15}$ | $2.1 \times 10^{16}$ | $5.9 \times 10^{15}$ |
| | After immersion in water | $7.8 \times 10^{15}$ | $1.4 \times 10^{15}$ | $9.7 \times 10^{14}$ | $1.2 \times 10^{16}$ | $4.0 \times 10^{15}$ |

EXAMPLE 11

Three silicon-containing butadiene polymers P, Q and R were prepared in the same manner as Example in 1 by the addition reaction of 1,1,1,3,5,5,5-heptamethyl-trisiloxane with Poly bd CS-15, NISSO PB G-1000 and NISSO PB TE2000, respectively, in which the degree of addition was such that about 50 mole % each of the ethylenically unsaturated linkages in the starting butadiene polymers were saturated.

Using silicon-containing polymers P, Q and R, two curable compositions (Nos. 12 and 13) were prepared by blending each ingredients in the varied amounts as indicated in Table VIII.

The compositions thus prepared and heat-cured products were subjected to the same tests as in Example 10. The details and results are set out in Table VIII.

Table VIII

| Composition No. | | 12 | 13 |
|---|---|---|---|
| Silicon- | P | 10 | 10 |
| containing | Q | 30 | 30 |
| butadiene polymer | R | 30 | 30 |
| Glycidyl methacrylate | | 5 | 20 |
| Lauryl methacrylate | | — | 40 |
| Chlorostyrene | | 55 | — |
| Quartz flour | | 120 | 120 |
| Iron oxide powder | | 5 | 5 |
| Antimony oxide | | 15 | 15 |
| Bromlite BR-55 | | 15 | 15 |
| Dechlorane Plus | | 15 | 15 |
| Co naphthenate solution | | 0.2 | 0.2 |
| Cumene hydroperoxide | | 1.5 | 1.5 |
| Viscosity of composition, poise at 25° C | | 18 | 25 |
| Hardness, Shore D | | 70 | 65 |
| Adhesive strength, kg/cm² | Polycarbonate resin | 85 | 80 |
| | Noryl resin | 100 | 90 |
| Flame retardancy, UL 94 | | Class V-0 | Class V-0 |
| Dielectric constant at 1 MHz, as cured | | 3.48 | 3.50 |
| Volume resistivity, ohm-cm, as cured | | $2.5 \times 10^{15}$ | $4.0 \times 10^{15}$ |

What is claimed is:

1. A curable composition comprising:
   (a) 100 parts by weight of a silicon-containing butadiene polymer having at least one organosilicon group bonded through the carbon-to-silicon linkage to the main chain in a molecule of a polybutadiene or a copolymer mainly composed of butadiene, said organosilicon group being represented by the general formula $R_3Si$— where R is a monovalent hydrocarbon group or an organosiloxy group,
   (b) from 1 to 200 parts by weight of an ethylenically unsaturated polymerizable monomer compound,
   (c) from 0 to 900 parts by weight of a filler, and
   (d) from 0.03 to 30 parts by weight of an organic peroxide.

2. The curable composition as claimed in claim 1 wherein said copolymer is a copolymer of butadiene with a comonomer selected from the class consisting of styrene, acrylonitrile, methacrylonitrile, acrylic acid, methacrylic acid, ethyl acrylate, butyl acrylate, 2-ethylhexyl acrylate, methyl methacrylate, ethyl methacrylate, n-butyl methacrylate, glycidyl methacrylate, α-chloroacrylonitrile, acrylamide, vinyl isobutyl ether, vinyl acetate, vinyl chloride, vinylidene chloride, methyl vinyl ketone, 2-vinylpyridine, 9-vinylcarbazol, α-methylstyrene, ethylene, and propylene.

3. The curable composition as claimed in claim 1 wherein said silicon-containing butadiene polymer is end-blocked at the chain terminals with groups of atoms selected from the class consisting of hydroxy groups, vinyl groups, allyl groups, methacryl groups, carboxyl groups, amino groups, mercapto groups, isocyanate groups, half ester groups of maleic acid, and halogen atoms.

4. The curable composition as claimed in claim 1 wherein said silicon-containing butadiene polymer is liquid at room temperature.

5. The curable composition as claimed in claim 1 wherein said organosiloxy group is a trimethylsiloxy group.

6. The curable composition as claimed in claim 1 wherein said monovalent hydrocarbon group is a methyl group.

7. The curable composition as claimed in claim 1 wherein the organosiloxy group is a (trimethylsiloxy)-dimethylsiloxy group.

8. The curable composition as claimed in claim 1 wherein in component (a), the molar ratio of the ethylenically unsaturated linkages and the organosilicon groups in said silicon-containing butadiene polymer is in the range from 85:15 to 10:90.

9. The curable composition as claimed in claim 1 wherein said ethylenically unsaturated polymerizable monomer compound is selected from the class consisting of styrene, α-methylstyrene, chlorostyrene, acrylic acid, methacrylic acid, ethyl acrylate, butyl acrylate, 2-ethylhexyl acrylate, methyl methacrylate, ethyl methacrylate, n-butyl methacrylate, lauryl methacrylate, glycidyl methacrylate, phenoxyethyl methacrylate, ethyleneglycol monomethacrylate, ethyleneglycol dimethacrylate, glycidyl methacrylate, polyoxyethyleneglycol dimethacrylate, trimethylolpropane methacrylates, triallyl cyanurate, diallyl phthalate, diethyl maleate and diethyl fumarate.

10. The curable composition as claimed in claim 1 wherein said ethylenically unsaturated polymerizable monomer compound is selected from the class consisting of styrene, chlorostyrene, n-butyl methacrylate, lauryl methacrylate, glycidyl methacrylate, and phenoxyethyl methacrylate.

11. The curable composition as claimed in claim 1 wherein the amount of component (b) is in the range from 5 to 150 parts by weight per 100 parts by weight of component (a).

12. The curable composition as claimed in claim 1 wherein component (c) is selected from the class consisting of quartz flour, fumed silica, precipitated silica, diatomaceous earth, talc, clay, alumina, calcium carbonate, zinc oxide, magnesium oxide, glass fibers, glass beads, and glass microballoons.

13. The curable composition as claimed in claim 1 wherein component (d) is selected from the class consisting of alkyl hydroperoxides, dialkyl peroxides, diacyl peroxides, peroxyesters, and ketone peroxides.

14. The curable composition as claimed in claim 13 wherein said alkyl hydroperoxide is cumene hydroperoxide.

15. The curable composition as claimed in claim 13 wherein said dialkyl peroxide is selected from di-tert-butyl peroxide, 1,1-bis-tert-butyl-3,3,5-trimethylcyclohexane, and dicumyl peroxide.

16. The curable composition as claimed in claim 13 wherein said diacyl peroxide is selected from benzoyl peroxide and 2,4-dichlorobenzoyl peroxide.

17. The curable composition as claimed in claim 13 wherein said peroxyester is selected from 2,5-dimethyl-2,5-di(benzoylperoxy)hexane and tert-butyl perbenzoate.

18. The curable composition as claimed in claim 13 wherein said ketone peroxide is methylethylketone peroxide.

19. The curable composition as claimed in claim 1 wherein the amount of component (d) is in the range from 0.1 to 5.0 parts by weight per 100 parts by weight of component (a).

* * * * *